US012355153B2

(12) United States Patent
Chieh

(10) Patent No.: US 12,355,153 B2
(45) Date of Patent: Jul. 8, 2025

(54) TRIPLE-MODE MONOPULSE TRACKING ANTENNA AND ANTENNA SYSTEM WITH RISLEY PRISM BEAM STEERING

(71) Applicant: The United States of America as represented by the Secretary of the Navy, San Diego, CA (US)

(72) Inventor: Jia-Chi Samuel Chieh, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 166 days.

(21) Appl. No.: 18/343,504

(22) Filed: Jun. 28, 2023

(65) Prior Publication Data

US 2025/0007175 A1 Jan. 2, 2025

(51) Int. Cl.

*H01Q 19/06* (2006.01)
*H01Q 3/00* (2006.01)
*H01Q 15/00* (2006.01)

(52) U.S. Cl.

CPC ......... *H01Q 15/0026* (2013.01); *H01Q 3/005* (2013.01); *H01Q 19/06* (2013.01)

(58) Field of Classification Search

CPC ..... H01Q 15/0026; H01Q 3/005; H01Q 19/06
See application file for complete search history.

(56) References Cited

U.S. PATENT DOCUMENTS 11,212,010 B2 * 12/2021 Uyeno ..................... H04B 1/16
2017/0025753 A1 * 1/2017 Driscoll ..................... G02F 1/31
2017/0025754 A1 * 1/2017 Driscoll ................. H01Q 15/02

(Continued)

FOREIGN PATENT DOCUMENTS

WO WO-2024253551 A1 * 12/2024

OTHER PUBLICATIONS

K. Debbarma, S. K. Sharma and J. -C. S. Chieh, "Beam Steering Response of X-band Triple-mode Horn with Three Element Risley Prism," 2022 IEEE International Symposium on Antennas and Propagation and USNC-URSI Radio Science Meeting (AP-S/URSI), presented at 2022 IEEE International Symposium on Antennas and Propagation and USNC-URSI Radio Science Meeting published between Jul. 10-15, 2022, published on IEEE Xplore on Sep. 21, 2022, pp. 643-644.

(Continued)

*Primary Examiner* — Awat M Salih
(74) *Attorney, Agent, or Firm* — Naval Information Warfare Center Pacific; Kyle Eppele; Evan L. Hastings

(57) ABSTRACT

A triple-mode monopulse tracking antenna and antenna system with risley prism beam steering. In particular, a monopulse tracking antenna, comprising: a triple-mode circular waveguide horn, configured to generate three monopulse patterns; at least two Risley prisms, each positioned a fixed distance from the triple-mode circular waveguide horn, configured to receive and steer the three monopulse patterns, wherein each Risley prism is coated with an anti-reflective layer; a means for axially rotating each of the at least two Risley prisms; and a parabolic phase correcting surface, positioned intermediately between the triple-mode circular waveguide horn and at least two Risley prisms.

18 Claims, 14 Drawing Sheets
(13 of 14 Drawing Sheet(s) Filed in Color)

300

(56) References Cited

U.S. PATENT DOCUMENTS

2017/0025756 A1 * 1/2017 Driscoll ............. G02B 27/4233

OTHER PUBLICATIONS

K. Debbarma, N. Truong, S. K. Sharma and J. -C. S. Chieh, "2-D Beam Steering Performance of a Triple Mode Horn Antenna Integrated With Risley Prism and Phase Correcting Surface," in IEEE Open Journal of Antennas and Propagation, vol. 3, pp. 752-761, Jun. 29, 2022.

Z. -Y. Wen, Y. -L. Ban, Y. Yang and Q. Wen, "Risley-Prism-Based Dual-Circularly Polarized 2-D Beam Scanning Antenna With Flat Scanning Gain," in IEEE Antennas and Wireless Propagation Letters, vol. 20, No. 12, pp. 2412-2416, Dec. 2021.

B. J. Tame and N. A. Stutzke, "Steerable Risley Prism antennas with low side lobes in the Ka band," 2010 IEEE International Conference on Wireless Information Technology and Systems, 2010.

M. Khan, "A Beam Steering Technique using Dielectric Wedges", University College London, MS Thesis, 1985.

S. K. Sharma and A. Tuteja, "Investigations on a triple mode waveguide horn capable of providing scanned radiation patterns," 2010 IEEE Antennas and Propagation Society International Symposium, 2010.

* cited by examiner

300

(d)

(e)

TRIPLE-MODE MONOPULSE TRACKING ANTENNA AND ANTENNA SYSTEM WITH RISLEY PRISM BEAM STEERING

STATEMENT REGARDING FEDERALLY-SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: niwc_patent.fct@us.navy.mil, referencing Navy Case No. 211,361.

BACKGROUND

Beam steering antennas play an important role in modern day communication systems used for both civilian and military applications. Electronic and mechanical steering are two conventional ways of realizing beam steering. Electronic steering employs active electronic components to acquire the variable phase shifts required for beam deviation. Traditional mechanical steering on the other hand rotates the entire antenna system on a gimbal using complex rotary systems. Electronic scanning provides a faster scan speed compared to its mechanical counterpart. However, electronic steering also has increased complexity in terms of RF circuitry as part of the beamforming network along with a higher fabrication cost, heat dissipation, and limited power handling capabilities.

Recently, beam steering structures inspired from optical Risley prism (RP) concept using dielectric wedges have emerged as attractive alternatives. A typical RP includes two identical phase shifting structures (PSSs) with a linear phase progression along one direction. Axial rotation of these identical PSSs individually and/or collectively leads to beam deviation without rotating the RF source. Mechanical rotation of these PSSs is simpler and consumes less DC power compared to the traditional mechanical rotation. Dielectric lenses employing the RP concept with WR-28 standard gain horn antenna for wider bandwidth are reported for millimeter (mm) wave frequencies. 3D printed low cost stepped and continuous dielectric lenses employing the RP concept are reported. Low profile flat versions of RPs are also reported using multilayered printed PSSs. Most of these reported structures employing RP concept achieved beam steering of more than ±40° in the elevation plane and a full 360° scan in the azimuthal plane with gain deviation less than 3 dB.

Beam steering antennas are widely popular for tracking applications such as monopulse tracking method. For monopulse tracking, sum and difference mode patterns are steered. Typically, generation and steering of sum and difference patterns are performed using reconfigurable arrays with electronic phase shifters or other active components. Use of active RF components make such system complex and costly. An alternate technique of generating sum and difference mode patterns is employing a multimode waveguide horn antenna. The generated beams can be steered subsequently using a pair of PSSs employing the RP concept. It offers a simple and low cost alternative to the complex reconfigurable arrays without using any active RF components. Accordingly, there is a need for monopulse tracking antennas and system that leverage these innovations in beam steering and employing RPs to reduce cost and simply the mechanisms.

SUMMARY

According to illustrative embodiments, a monopulse tracking antenna, comprising: a triple-mode circular waveguide horn, configured to generate three monopulse patterns; at least two Risley prisms, each positioned a fixed distance from the triple-mode circular waveguide horn, configured to receive and steer the three monopulse patterns, wherein each Risley prism is coated with an anti-reflective layer; a means for axially rotating each of the at least two Risley prisms; and a parabolic phase correcting surface, positioned intermediately between the triple-mode circular waveguide horn and at least two Risley prisms.

Additionally, a monopulse tracking antenna system, comprising: a triple-mode circular waveguide horn, configured to generate three monopulse patterns; at least two Risley prisms, each positioned a fixed distance from the triple-mode circular waveguide horn, configured to receive and steer the three monopulse patterns, wherein each Risley prism is coated with an anti-reflective layer; a means for axially rotating each of the at least two Risley prisms; and a parabolic phase correcting surface, positioned intermediately between the triple-mode circular waveguide horn and at least two Risley prisms.

This disclosure comprises a passive 2-D beam steering antenna design which can steer both sum and difference mode patterns. It also comprises of a triple-mode circular waveguide (TM-CW) horn antenna with two identical dielectric PSSs and a parabolic phase correcting surface (PPCS). The TM-CW horn antenna may be operated in either of the three modes (TE11,TM01 and TE21) with proper excitation of the assigned ports. The pair of identical dielectric PSSs may be used for beam steering and the PPCS may be used for improving the overall performance of the scanned patterns. Typical realization of monopulse antenna patterns is through the use of a 4-horn feed cluster. This is complex. Instead, this disclosure comprises a 3-mode horn antenna. This method generates monopulse patterns, which are necessary for RF antenna tracking, within a single antenna unit without the need of a complex monopulse feed network or a 4-horn feed cluster. The method also leverages dielectric prism lenses, to perform beam steering. The benefit is that the beam is steered by simply rotation of the lenses, which is 1-axis of motion. A typical antenna gimbal is 3-axis of motion, and could have higher failure rates due to higher mechanical complexity.

It is an object to provide a Triple-Mode Monopulse Tracking Antenna and Antenna System with Risley Prism Beam Steering that offers numerous benefits, including is easy to implement and provides 2-D beam steering for all the three modes from TM-CW horn source. Such beam steering is suitable for applications such as monopulse tracking which takes advantage of scanned sum and difference patterns.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

Figure 1A:
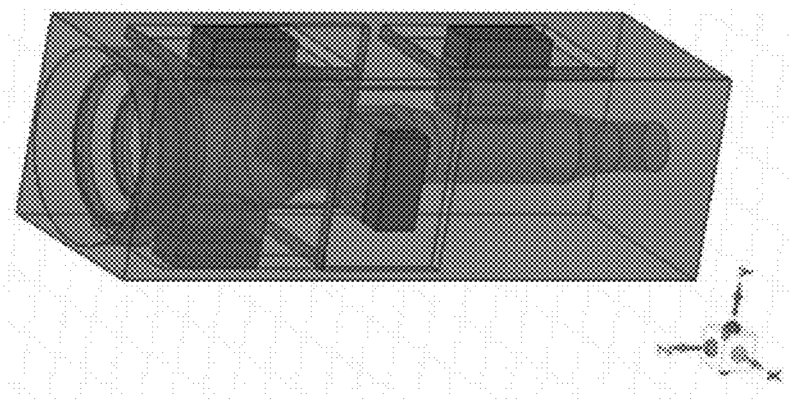
FIG. 1A is an exemplary illustration of a feed source.

The disclosed system and apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other system and apparatus described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Auto-tracking antennas typically require two things, the ability to form monopulse antenna patterns, and the ability to steer the beam to perform the tracking.

Monopulse refers to a method where three distinct antenna patterns are generated, and they are compared against each other to determine how off-axis the beam is. The three patterns are a summation beam (typical antenna beam where the gain is peak at zenith), a difference beam in Azimuth (gain has a deep null at zenith), and a difference beam in elevation (gain has a deep null at zenith). When a signal is received, both the amplitude and phase can be compared between the Summation and Difference beam. The angular position can be known by making this comparison in either phase or amplitude of the received signal. The receive signal may be a beacon continuous wave (CW) tone, or may also be a modulated waveform.

A typical monopulse patterns may be formed are with a feed-horn cluster of 4 antennas. Behind the antenna is what is known as a monopulse comparator network, which takes the 4 antennas and combines them to form 3-distinct RF feeds for the 3 monopulse patterns (Summation, Az Diff, El Diff). 4-Horn feed clusters are typically very complex and requires this passive monopulse feed network.

The ability to steer the antenna beam to perform the tracking is the second requirement. Modern antennas typically use a 3-axis gimbal in order to steer the antenna. This can be bulky, complex, and could have a high mean-time-to-failure due to the mechanical parts. This disclosure proposes, among other things, using a plurality of Risley prisms to steer the beam using only 1-axis of motion. In one embodiment, the 1-axis of motion is axially rotation.

In one embodiment, one antenna may use have two dielectric prism lenses. The dielectric constant (permittivity), and the slope of the prism relaters to the resulting steering angle you get. With a single lens, the results are conical steering as the lens rotates. With two prism lenses, the results are hemispherical scanning. Beam scan may be obtained by rotation of the lenses, which is 1-axis of motion.

As mentioned in the sections above, typical realization of monopulse antenna patterns is through the use of a 4-horn feed cluster. This is complex. Instead, this disclosure comprises a 3-mode horn antenna. Horn antennas and waveguides are known to support multiple radiating modes. Most of the times, these higher order modes are un-desirable. Here, they are excited on purpose to generate the three modes.

Figure 1B:
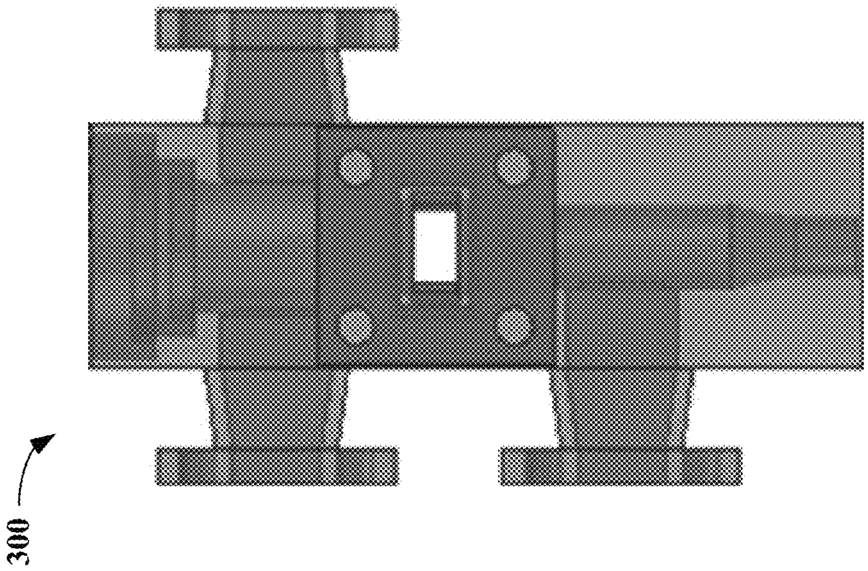
FIG. 1B is an additional exemplary illustration of a feed source.
Figure 1C:
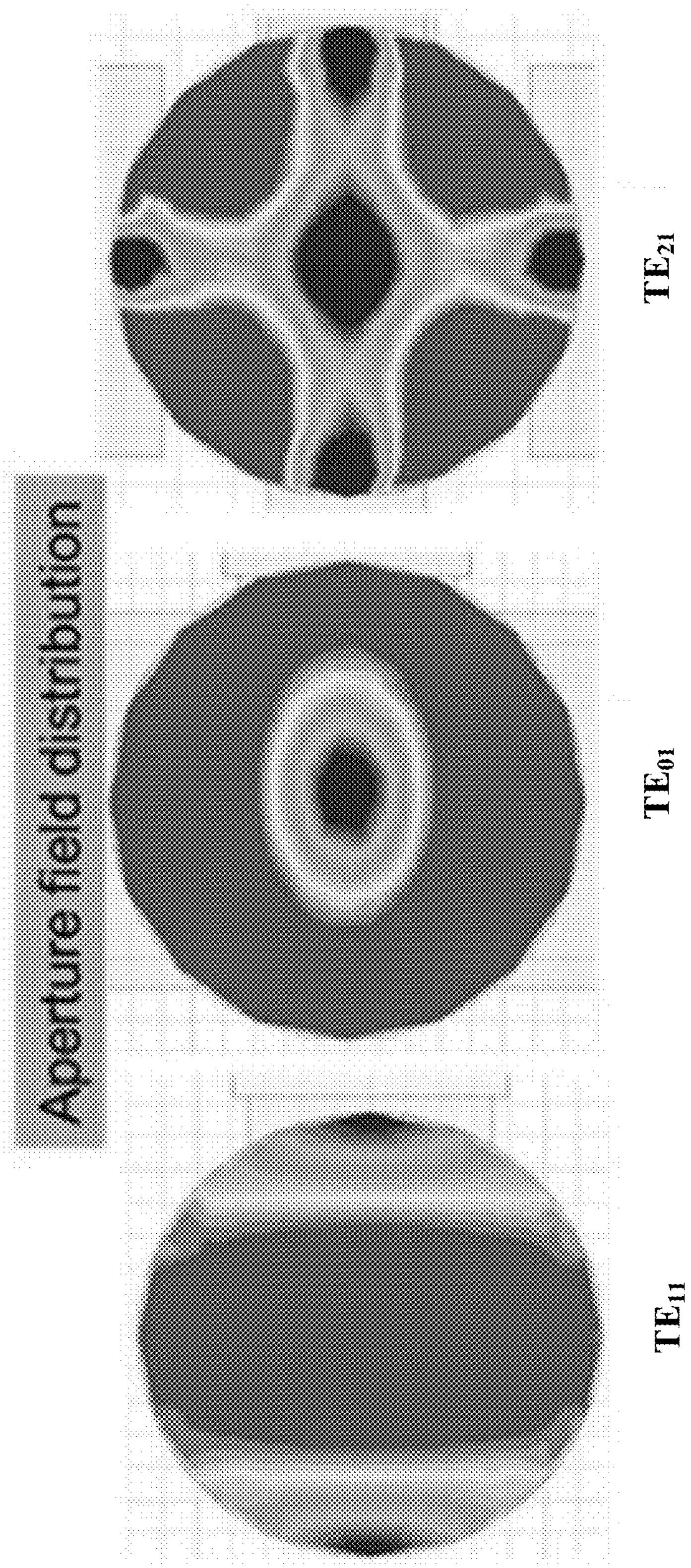
FIG. 1C is an aperture field distribution of a $TE_{11}$ summation beam, $TE_{21}$ Az Difference Beam, and the $TM_{01}$ form the El Difference beam.
Figure 1D:
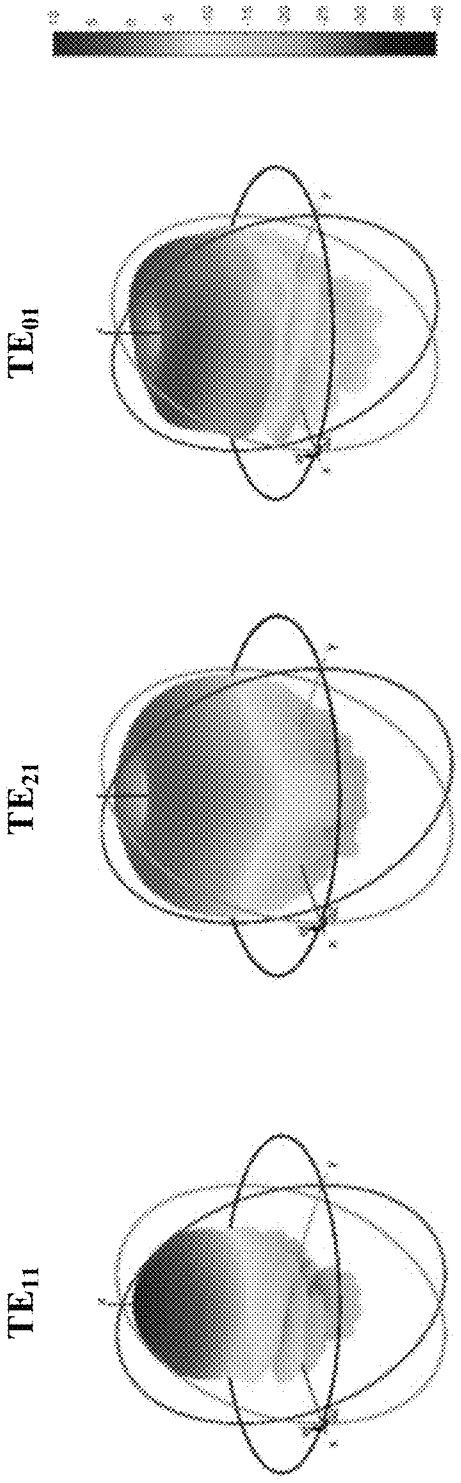
FIG. 1D comprises an exemplary simulation of difference pattern.

FIGS. 1A and 1B show one embodiment of an illustrated feed source, comprising a triple-mode circular wave horn 100. As can be seen, there are 3-sets of RF ports, along the waveguide feed of the horn antenna. These 3-sets of RF ports excite the waveguide antenna/horn with three distinct radiating modes, as illustrated in FIGS. 1C and 1D, in one embodiment. As mentioned previously, the TE11 mode forms the summation beam, the TE21 forms the Az Difference, and the TM01 forms the El Difference beam. The Az and El are relative, depending on the orientation of the antenna.

As shown in FIGS. 1C and 1D, the difference pattern has a null at zenith, which is necessary. The Summation has a peak at zenith. The exemplary antenna now, intrinsically, generates the monopulse patterns, without the need of a complex monopulse feed network or a 4-horn feed cluster. Now, in order to scan the beam, we leverage the Risley Prism.

Figure 2A:
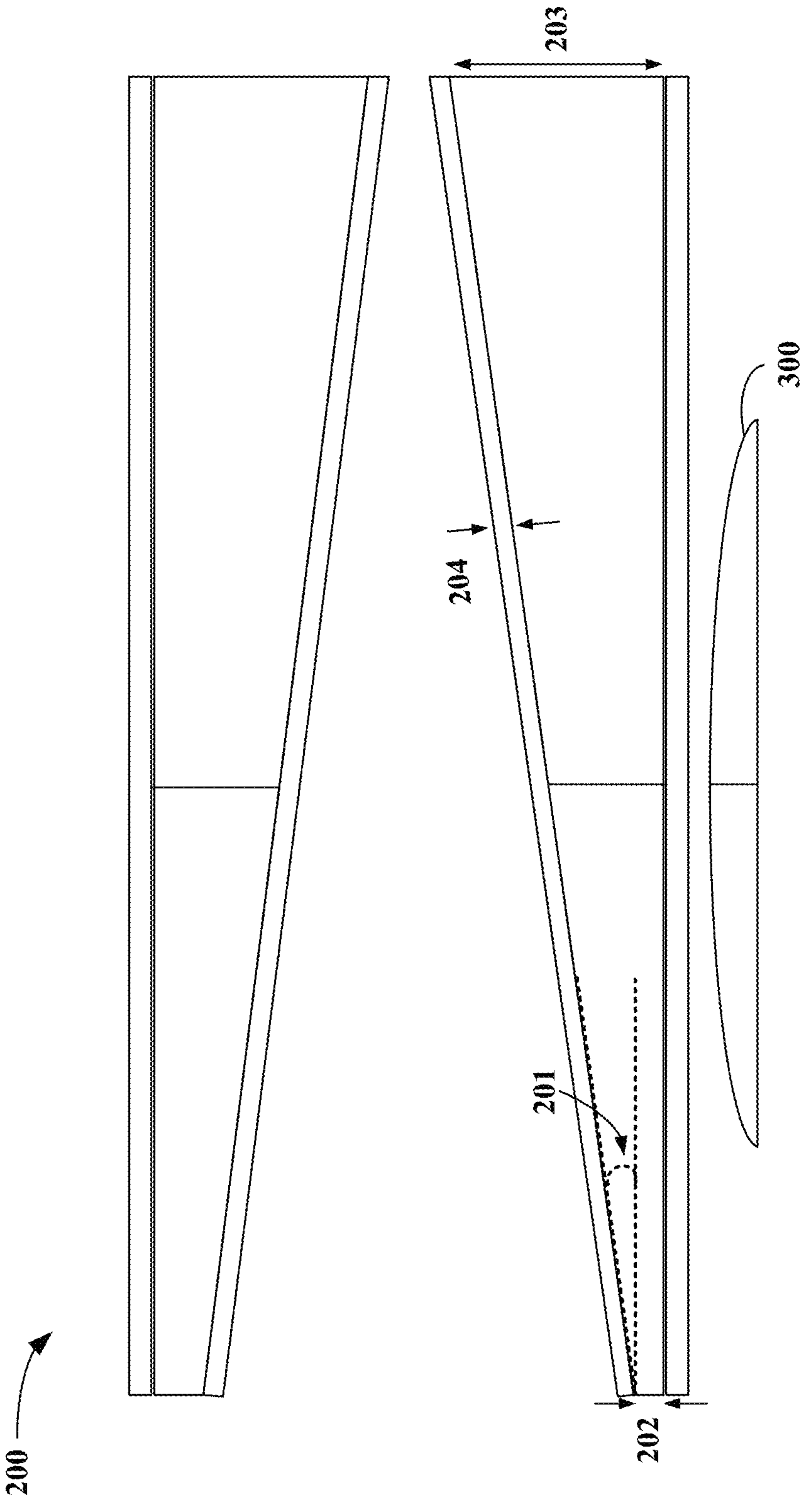
FIG. 2A shows a cross-sectional illustration of dielectric lens making up a Risley Prism.

FIG. 2A shows an exemplary illustration of a Risley Prism 200 comprising a pair of identical dielectric lenses 200, comprising: a lens angle 201, lens initial height 202, lens final height 203, anti-reflective (AR) layer 204, and parabolic phase correcting surface 300. Typical Risley Prisms 200 comprise includes two identical phase shifting structures (PSSs), or dielectric lenses. Each dielectric lens 200 may be wedge shaped prism, which offers phase gradient along a particular direction and equal phase along the orthogonal direction. The triple-mode circular wave horn 100 is positioned a set distance from the Risley Prism 200, which may be optimized through EM simulations. The horn 100 antenna shoots through a parabolic phase correcting surface 300, which converts spherical wave fronts into a planar one, which enhances the gain of the antenna feed source. Then, it shoots into Risley Prisms 200, each with a set permittivity and slope. What is unique is that all three monopulse patterns (radiating modes) can be steered with the Risley Prism. The ability to scan the monopulse patterns is necessary for the RF tracking.

Figure 2B:
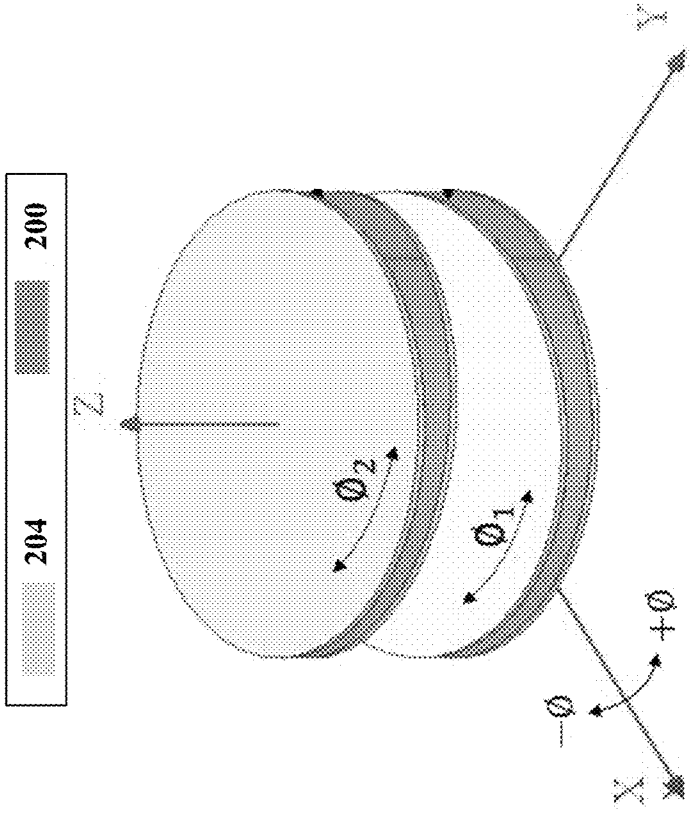
FIG. 2B shows an isometric illustration of a Risley Prism.

Risley Prisms 200 employs a pair of axially rotating PSSs to deflect the incident beam from the illuminating source in a particular direction. The amount of beam deviation depends on the dielectric material and slope (δ) of the lenses 201. In one embodiment, a pair of wedged shaped dielectric lenses 200 may be used as PSSs as shown in FIG. 2B. The orientation angles of the top and bottom elements are given by Ø1 and Ø2, respectively. Both the elements of the Risley prism may be identical in shape and build with the same dielectric material. The dielectric constant of the prism material and the slope of the wedge plays an important role achieving the range of beam deviation. The Risley Prisms 200 may be coated with an anti-reflective layer 204 (e.g. quarter wave matching layer) which prevents RF reflections, to enhance the gain. In one embodiment, the Risley Prisms 200 are made up of Titanates (TD-13) with a dielectric constant of 13.2. In one embodiment both top and bottom side of the dielectric lenses are covered by an anti-reflective (AR) layer made of RT Duroid 4350B with $\varepsilon_r$=3.55 and height of 0.762 mm. In another embodiment, the anti-reflective (AR) layer 204 of Polyimide has a dielectric constant of 3.55 and height (t) covers both sides of each prism for better matching.

Figure 2C:
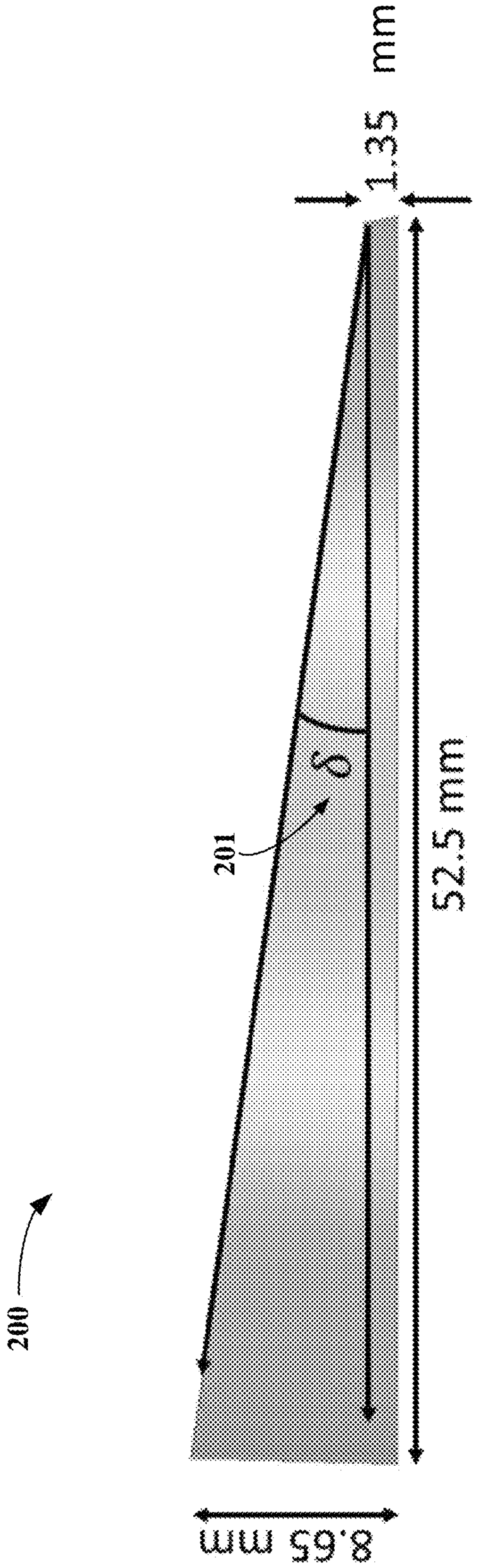
FIG. 2C shows exemplary dimension details of the identical dielectric PSS.

FIG. 2C shows exemplary dimension details of the identical dielectric PSS, comprising an initial height of 1.35 mm, length of 52.5 mm, and a final height of 8.65 mm, without the anti-reflective layer. An initial estimate of the beam deviation can be obtained by using the following (see equations 1-3). θ1 and θ2 represents the beam deviation by bottom and top PSSs, respectively.

$$\theta_1 = \sin^{-1}\left(\sqrt{\varepsilon_r}\sin(\delta)\right) - \delta \quad (1)$$

$$\theta_1 = \sin^{-1}\left(\sqrt{\varepsilon_r}\sin(\theta' + \delta)\right) \quad (2)$$

$$\theta' = \sin^{-1}\left(\frac{\sin(\theta_1 - \delta)}{\sqrt{\varepsilon_r}}\right) \quad (3)$$

In FIG. 2C, δ and $\varepsilon_r$ represent slope angle and dielectric constant of the dielectric lens, respectively.

Figure 2D:
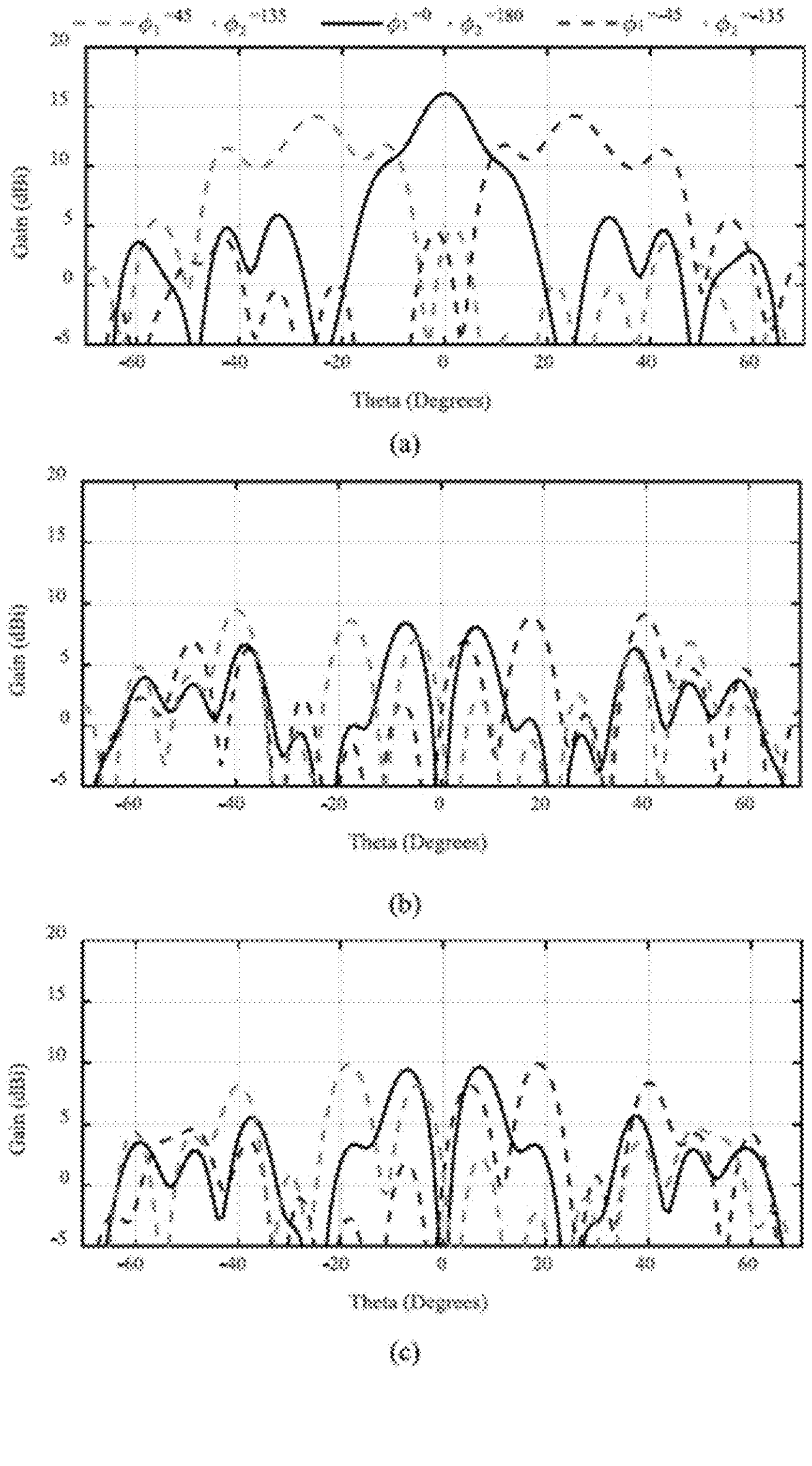
FIG. 2D shows, in graphs (a), (b), and (c), the beam deviation by the proposed RP with the proposed horn without the PPCS at Ø=90° plane.

FIG. 2D shows, in graphs (a), (b), and (c), the beam deviation by the proposed RP with the proposed horn without the PPCS at Ø=90° plane. The steered patterns are found to be distorted for all the three modes of TM-CW horn antenna. This is due to phase errors from the illuminating source and can be corrected by a phase correcting surface, which is discussed next.

The parabolic phase correcting surface (PPCS) 300 can convert spherical wave fronts into a planar one, which enhances the gain of the antenna feed source. In one embodiment work, a plano-parabolic dielectric lens is used as the phase correcting surface (PCS). In one embodiment, the PPCS may be a 3D printed Polylactic acid (PLA) material with dielectric constant of 2.7. This PPCS design may meet an objective of building a low cost prototype. The working theory of PPCS is similar to PSS. A PCS collimates the incident beam from an illuminating source by varying either the dielectric constant or the thickness of the lens. The proposed PPCS design herein has a parabolic profile with varying thickness and a fixed dielectric constant ($\varepsilon_r$).

In one embodiment, the PPCS has a focal length of 20 mm and a diameter of 40 mm. In this case optimum gain using the PPCS may be achieved by placing it at 30 mm above the TM-CW horn source. Apart from reducing distortions in the steered patterns, the overall gain of the steered patterns is also improved by around 2 dB for all the three modes. Side lobe level of the steered higher order mode patterns are also reduced by employing the PPCS.

Figure 3:
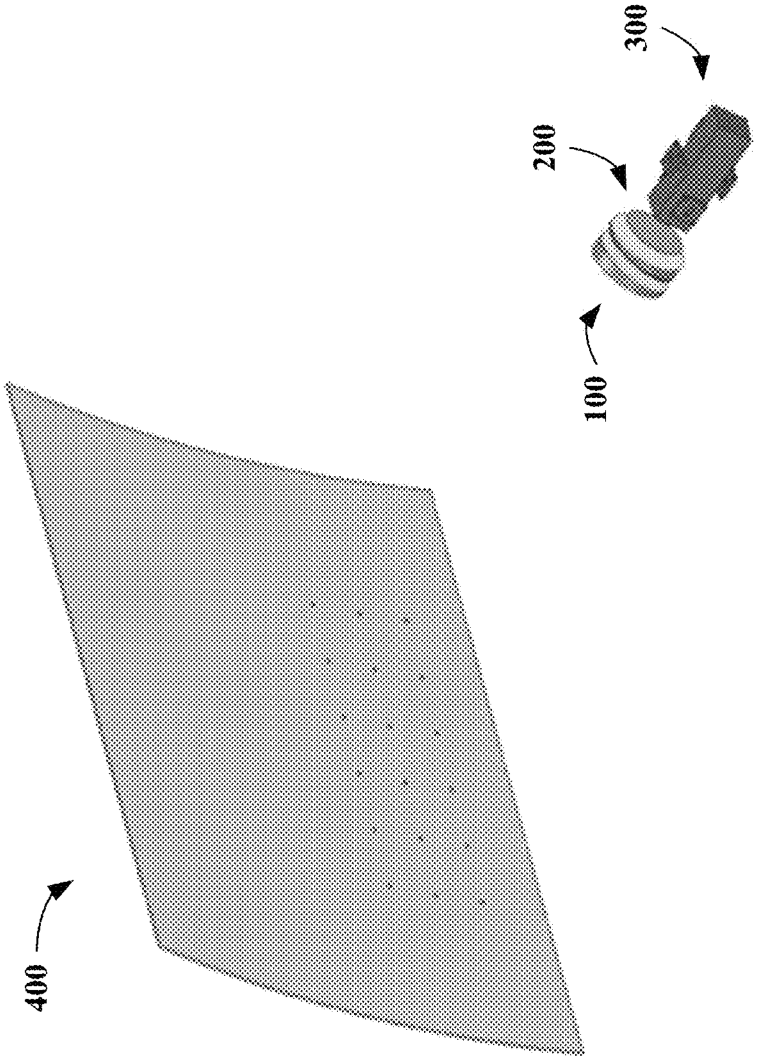
FIG. 3 shows an exemplary illustration of a monopulse antenna tracking system.

FIG. 3 shows an exemplary illustration of a monopulse antenna tracking system comprising a feed source 100, a plurality of Risley prisms 200, a parabolic phase correcting surface 300, and a parabolic cylindrical reflector 400. In order to enhance the gain, the 3-mode horn antenna 100 and Risley prism 200 combination could be combined with a parabolic cylindrical reflector 400. The cylindrical reflector 400 may only have 1-axis which has a parabolic contour, in one embodiment. This allows beam scan through the reflector, whereas a typical parabolic reflectors' 400 contour may not allow for beam scanning. The focal distance (F/D ratio) may be be optimized in simulation.

Figure 4A:
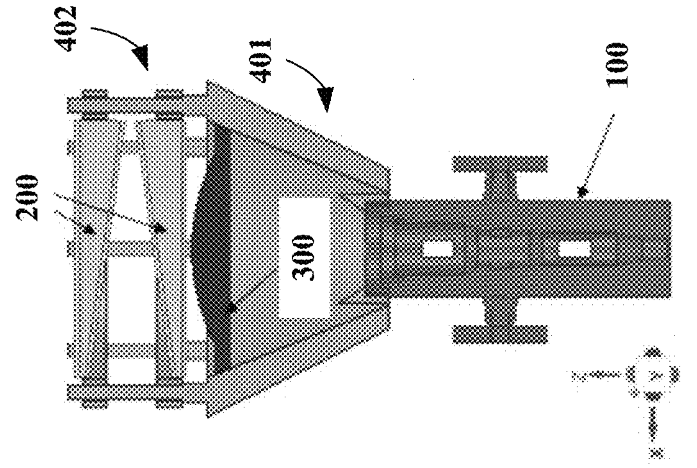
FIG. 4A shows an exemplary isometric illustration of a monopulse tracking antenna.

FIG. 4A shows an exemplary isometric illustration of a monopulse tracking antenna comprising a feed source 100, a plurality of Risley prisms 200, and a parabolic phase correcting surface 300.

Risley prisms have garnered much interest among the antenna research community for beam steering applications. RPs offer beam steering without the use of any active RF components or complex 3-D tilting mechanisms. An elevation scan of ±50° with gain deviation less than 3 dB is achieved using these flat RPs. In some instances, 3D stepped dielectric wedges may be used as RP for beam steering application for millimeter-wave frequencies. Alternatively, flat RPs offer a lower profile when compared to its dielectric wedge counterparts. However, these printed RPs also suffer from the inherent narrow bandwidth associated with microstrip structures. Typical RPs with scan range more than ±50 in the elevation plane without significant gain deviation are not reported in literature. Increasing the slope of the dielectric lenses for a larger scan angle leads to bulkier lenses, beam distortion, internal reflection, etc.

Adding a third dielectric lens to the typical RP offers more degrees of freedom and may be a potential solution for wider beam scanning with minimal gain deviation. The dielectric wedges in a three element RP system can have different dimensions. A combination of individual and collective orientation of the three dielectric wedges may provide an elevation scan of ±76° with full azimuthal angle scan.

Figure 4C:
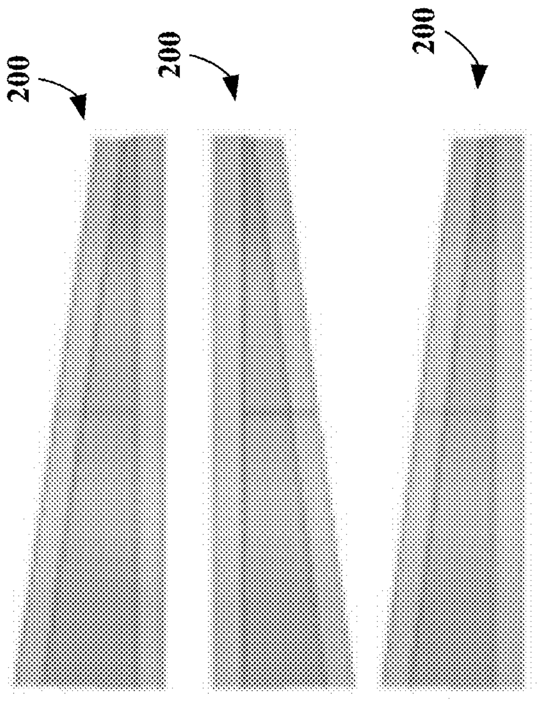
FIG. 4C shows an exemplary illustration of a close up view of the three element RP cross-section.
Figure 4B:
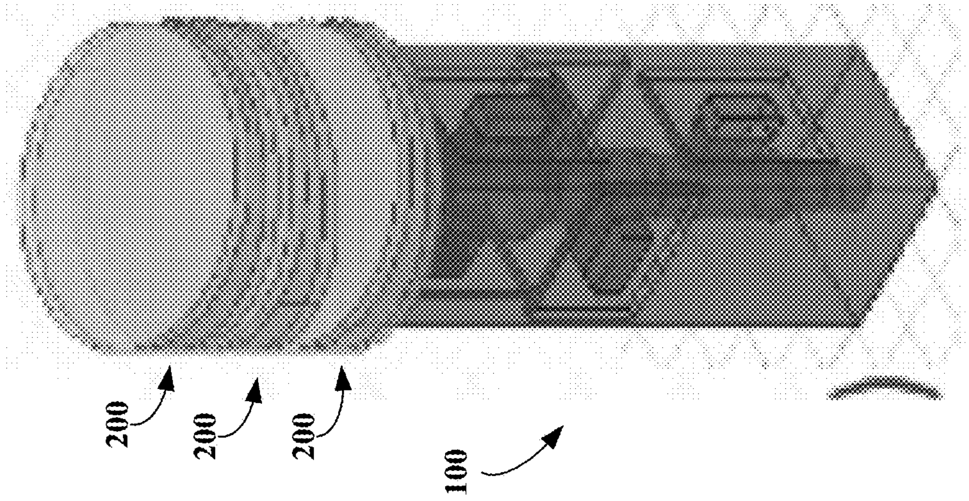
FIG. 4B shows an exemplary illustration three element RP.

Additionally, an additional third prism may be positioned on the top of a conventional pair of identical prisms for wide angle beam steering. FIGS. 4B and 4C show an illustrated exemplary three element RP 200, and a close up view of the three element RP 200 cross-section. This embodiment of a three element RP 200 comprises of a pair of dielectric lenses with similar dimensions and a third wedge prism with a slightly different dimension. Orientation angle of L1, L2 and L3 may be designated as $Ø_1$, $Ø_2$ and $Ø_1$, respectively. A typical RP achieves beam scanning by changing orientation of the dielectric lenses, both individually and collectively. Each dielectric lens is a wedge shaped prism, which offers phase gradient along a particular direction and equal phase along the orthogonal direction. Design parameters of the individual dielectric lenses of the exemplary three element RP may be similar to the dimensions shown in FIG. 2A.

As discussed previously, the three element design may also utilize an anti-reflective (AR) layer of Polyimide and the dielectric wedges may be made up of Titanates (TD-13). A triple-mode horn operating in $TE_{11}$ mode at X-band may be used as a feed source for the three element RP design. In case of the typical two element RP, scanned beams from dielectric lens with $\theta_1 \geq 10°$ suffer from total internal reflection and are severely distorted. This puts a limit on the maximum beam scan angle especially when lenses with higher dielectric constant are used. Materials with lower dielectric constant will lead to a bulkier dielectric lens due to requirement of larger phase gradient. In case of a three element RP in FIG. 4(D), the beam gets deviated more than ±70° with less distortion for $\theta = \theta \leq 8°$. Thus, for smaller values of θ1 and θ2, larger beam scanning is achieved. The beam steering performance of the three element RP may be optimized with the equation: $\theta_2 - \theta_1 = 1°$.

Figure 4D:
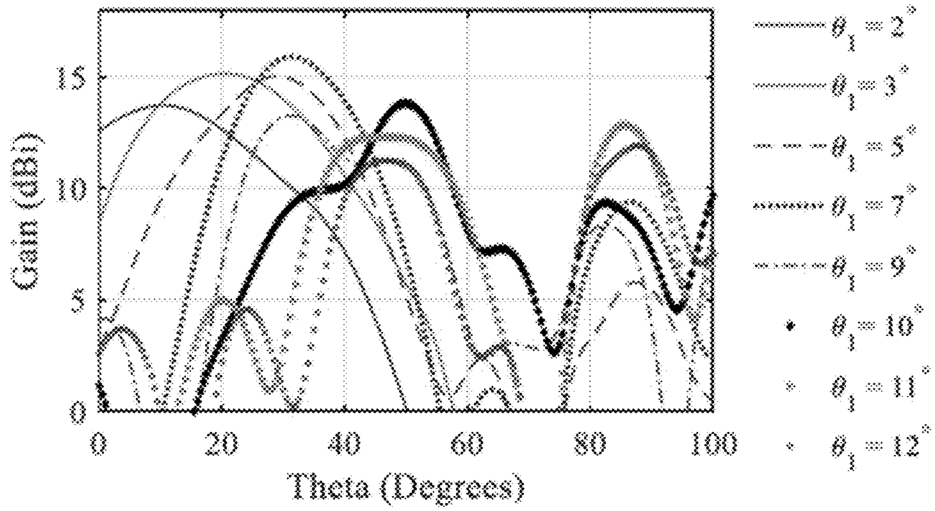
FIG. 4D shows beam steering Gain at Ø=90° plane for an exemplary (d) two element RP embodiment and exemplary (e) three element RP embodiment for different values of $\theta_1$ and $\theta_2$.
Figure 4D:
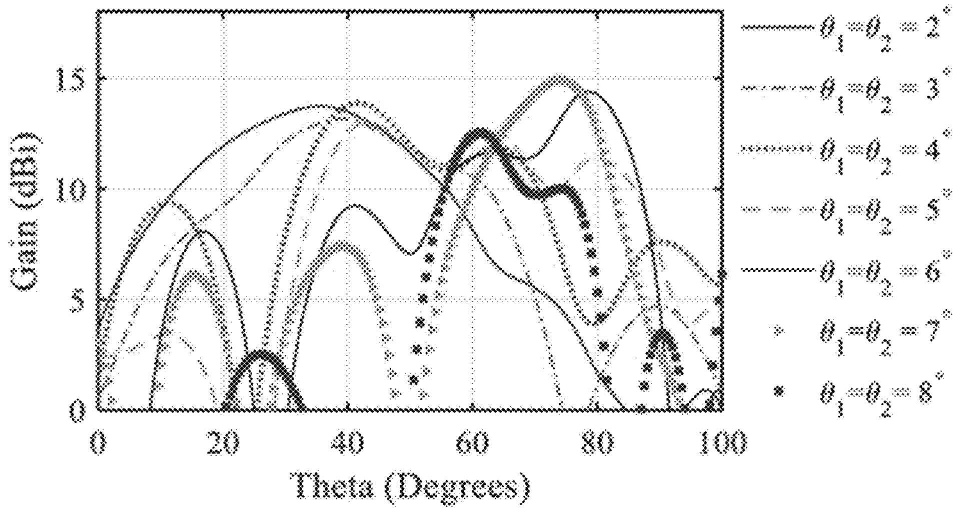

FIG. 4D shows beam steering at Ø=90° plane for an exemplary (d) Two element RP embodiment and exemplary (e) Three element RP embodiment for different values of $\theta_1$ and $\theta_2$. Illumination source is $TE_{11}$ mode of Y-polarized triple mode horn antenna operating at 10 GHz. Orientation angle of L1, L2 and L3 are given by $Ø_1 = Ø_2 = Ø_3 = -90°$.

Figure 4E:
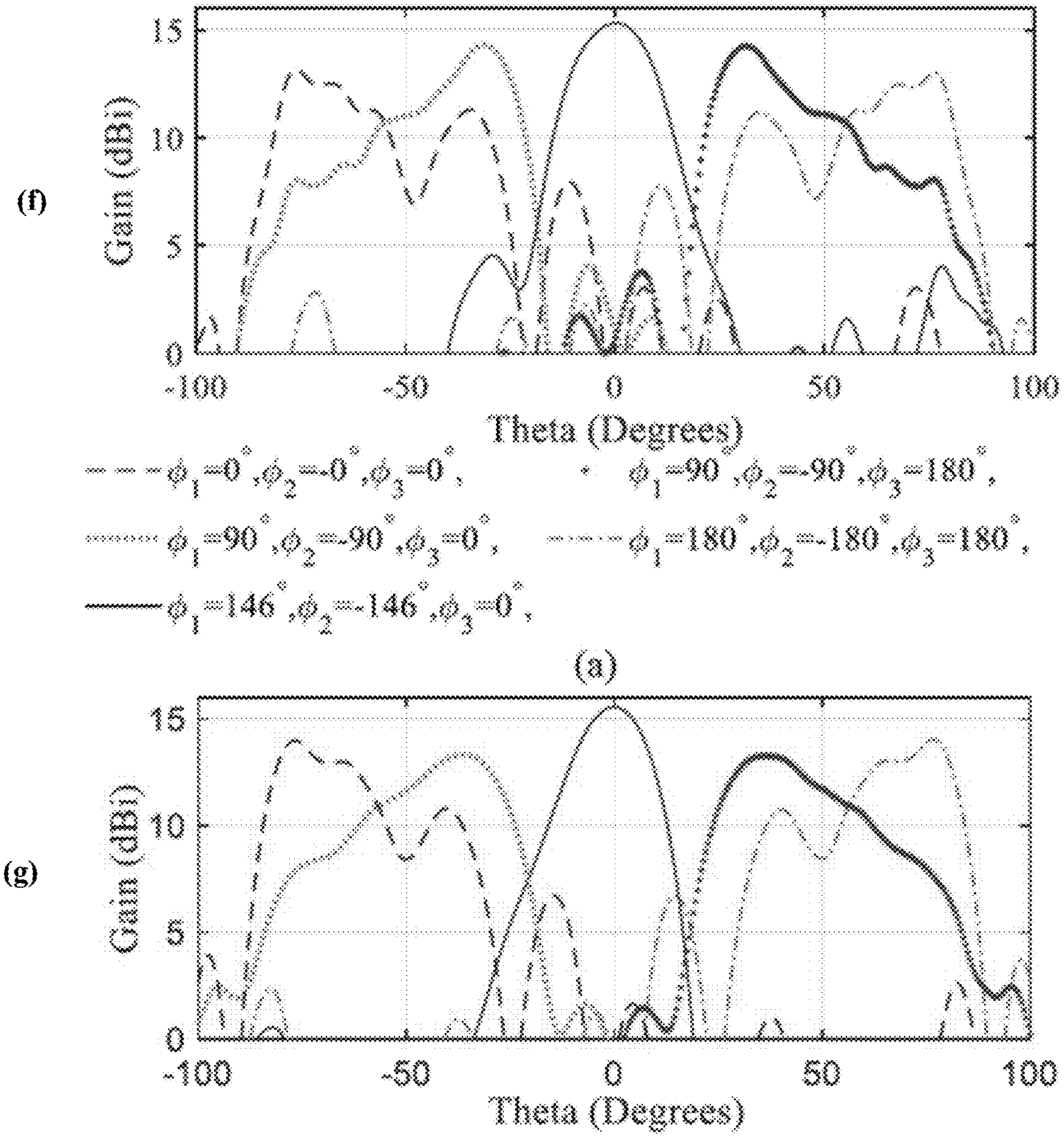
FIG. 4E shows beam steering performance of the three element RP with dominant mode of triple mode horn antenna as source (a) at Ø=0° plane (b) at Ø=90° plane.

FIG. 4E shows beam steering performance of the three element RP with dominant mode of triple mode horn antenna as source (a) at Ø=0° plane (b) at Ø=90° plane. Orientation angle of L1, L2 and L3 are given by $Ø_1$, $Ø_2$ and $Ø_3$, respectively. Furthermore, FIG. 4E shows the exemplary beam steering performance of the three element RP with dimension ($t_1 = t_2 = 2$ mm, 1=7.5°, $\theta_2 = 8.5°$ and D=100 mm) along Ø=0° plane and Ø=90° plane, respectively. A beam deviation more than 76° is achieved when all the three exemplary elements of the RP have similar orientation (phase gradient of all the three elements add up constructively). The beam may then be scanned by collective or individual rotation of lenses. Boresight beam is achieved when phase gradient of the additional third lens is cancelled by the cumulative phase gradient of the RP pair. Beam deviation due to the additional lens is achieved when the phase gradient of the typical RP pair cancel each other. The gain deviation at both the cut planes is than 3 dB. Accordingly three element RP can be considered as a good option in applications where the beam scanning requirement is almost the entire hemisphere.

Figure 5B:
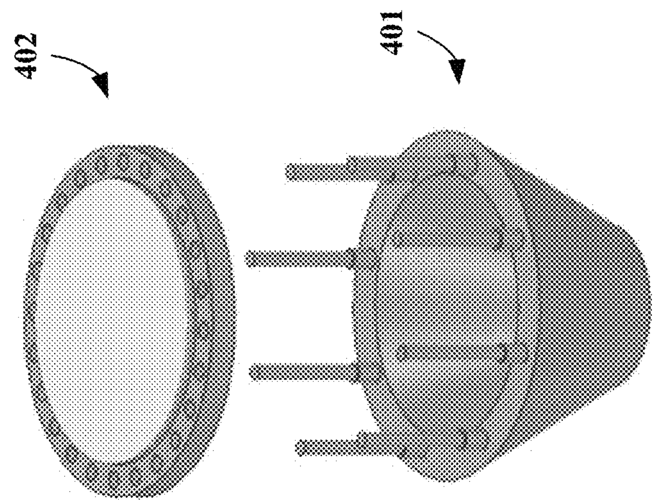
FIG. 5B shows an exemplary exploded-view illustration of a monopulse antenna tracking system.
Figure 5A:
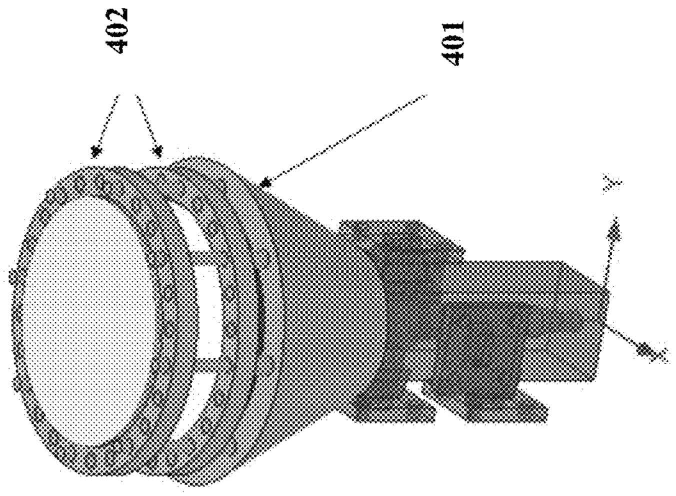
FIG. 5A shows an exemplary illustration of a monopulse antenna tracking system.

FIG. 5A shows an exemplary illustration of a monopulse antenna tracking system, further comprising a PPCS support structure 401 a Risley Prism support structure 402. The PPCS support structure 401 a Risley Prism support structure 402 are shown, separately, in FIG. 5. The support structures may encase and hold the plurality of Risley prisms. In one embodiment, the PPCS support structure 401 and Risley Prism support structure 402 may be 3D printed. Similarly, FIG. 5B shows an exemplary exploded-view illustration of a monopulse antenna tracking system, further comprising a PPCS support structure 401 a Risley Prism support structure 402.

From the above description of Triple-Mode Monopulse Tracking Antenna and Antenna System with Risley Prism Beam Steering, it is manifest that various techniques may be used for implementing the concepts of a monopulse tracking antenna and monopulse tracking antenna system without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that monopulse tracking antenna and monopulse tracking antenna system are not limited to the particular embodiments described herein, but is capable of many embodiments without departing from the scope of the claims.

What is claimed:

1. A monopulse tracking antenna, comprising:

a triple-mode circular waveguide horn, configured to generate three monopulse patterns;

at least two Risley prisms, each positioned a fixed distance from the triple-mode circular waveguide horn, configured to receive and steer the three monopulse patterns, wherein each Risley prism is coated with an anti-reflective layer;

a means for axially rotating each of the at least two Risley prisms; and a parabolic phase correcting surface, positioned intermediately between the triple-mode circular waveguide horn and at least two Risley prisms.

2. The monopulse tracking antenna of claim 1, further comprising three Risley prisms.

3. The monopulse tracking antenna of claim 1, further comprising a 3D printed support structure Risley prisms.

4. The monopulse tracking antenna of claim 1, wherein the three independent modes are $TE_{11}$, $TM_{01}$, and $TE_{21}$.

5. The monopulse tracking antenna of claim 1, wherein the dielectric wedges comprise Titanates with a dielectric constant of 13.2.

6. The monopulse tracking antenna of claim 1, wherein the anti-reflective layer has a dielectric constant of 3.55.

7. The monopulse tracking antenna of claim 1, wherein the height of the anti-reflective layer is about 0.762 mm.

8. The monopulse tracking antenna of claim 1, wherein the dimensions, without the anti-reflective layer, comprise an initial height of 1.35 mm, length of 52.5 mm, and final height of 8.65 mm.

9. The monopulse tracking antenna of claim 1, wherein the parabolic phase correcting surface has a focal length of 20 mm and a diameter of 40 mm and wherein the PPCS is placed 30 mm from the triple-mode circular waveguide horn.

10. A monopulse tracking antenna system, comprising:

a triple-mode circular waveguide horn, configured to generate three monopulse patterns;

at least two Risley prisms, each positioned a fixed distance from the triple-mode circular waveguide horn, configured to receive and steer the three monopulse patterns, wherein each Risley prism is coated with an anti-reflective layer;

a means for axially rotating each of the at least two Risley prisms; and a parabolic phase correcting surface, positioned intermediately between the triple-mode circular waveguide horn and at least two Risley prisms.

11. The monopulse tracking antenna system of claim 9, further comprising three Risley prisms.

12. The monopulse tracking antenna system of claim 9, further comprising a 3D printed support structure Risley prisms.

13. The monopulse tracking antenna system of claim 9, wherein the three independent modes are $TE_{11}$, $TM_{01}$, and $TE_{21}$.

14. The monopulse tracking antenna system of claim 9, wherein the dielectric wedges comprise Titanates with a dielectric constant of 13.2.

15. The monopulse tracking antenna system of claim 9, wherein the anti-reflective layer has a dielectric constant of 3.55.

16. The monopulse tracking antenna of claim 9, wherein the height of the anti-reflective layer is about 0.762 mm.

17. The monopulse tracking antenna system of claim 9, wherein the dimensions, without the anti-reflective layer, comprise an initial height of 1.35 mm, length of 52.5 mm, and final height of 8.65 mm.

18. The monopulse tracking antenna system of claim 9, wherein the parabolic phase correcting surface has a focal length of 20 mm and a diameter of 40 mm and wherein the PPCS is placed 30 mm from the triple-mode circular waveguide horn.

* * * * *